US012153365B2

(12) United States Patent
Sekimizu et al.

(10) Patent No.: US 12,153,365 B2
(45) Date of Patent: Nov. 26, 2024

(54) IMAGE HEATING APPARATUS AND IMAGE FORMING APPARATUS

(71) Applicant: CANON KABUSHIKI KAISHA, Tokyo (JP)

(72) Inventors: Koichi Sekimizu, Numazu (JP); Koichi Yamada, Mishima (JP); Seiji Obata, Mishima (JP); Teruhiko Namiki, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 17/958,632

(22) Filed: Oct. 3, 2022

(65) Prior Publication Data

US 2023/0027168 A1 Jan. 26, 2023

Related U.S. Application Data

(63) Continuation of application No. 16/902,548, filed on Jun. 16, 2020, now Pat. No. 11,487,230.

(30) Foreign Application Priority Data

Jun. 19, 2019 (JP) ................................ 2019-113878
Apr. 14, 2020 (JP) ................................ 2020-072459

(51) Int. Cl.
*G03G 15/20* (2006.01)

(52) U.S. Cl.
CPC ................................ *G03G 15/2053* (2013.01)

(58) Field of Classification Search
None
See application file for complete search history.

(56) References Cited

U.S. PATENT DOCUMENTS 10,379,467 B2 8/2019 Muramatsu
10,429,781 B2 10/2019 Shimura
(Continued)

FOREIGN PATENT DOCUMENTS

CN 103913979 A 7/2014
EP 0461596 A2 12/1991
(Continued)

OTHER PUBLICATIONS

Office Action issued in U.S. Appl. No. 16/902,548 mailed Jun. 14, 2021.

(Continued)

*Primary Examiner* — Jas A Sanghera
(74) *Attorney, Agent, or Firm* — ROSSI, KIMMS & McDOWELL LLP

(57) ABSTRACT

Provided is an image heating apparatus comprising: a first rotating member; a second rotating member that forms a nip with the first rotating member so as to nip the recording material therebetween; a heater that heats the nip; a conductive sheet member that is disposed so as to overlap with a part of the heater; and a restricting member that restricts relative positions between the sheet member and the heater. The restricting member is configured so as to restrict a relative movement between the sheet member and the heater in a first direction, which is a direction where the sheet member overlaps with a part of the heater, and to allow the relative movement in a second direction which is perpendicular to the first direction. A reinforcing land, that joins the heater and the sheet member, is disposed in a position that is electrically isolated.

6 Claims, 10 Drawing Sheets

(56) References Cited

U.S. PATENT DOCUMENTS

| | | | | |
|---|---|---|---|---|
| 11,487,230 | B2 * | 11/2022 | Sekimizu | G03G 15/2053 |
| 2013/0302060 | A1 | 11/2013 | Moriya | |
| 2015/0277309 | A1 | 10/2015 | Kuroda | |
| 2015/0341985 | A1 | 11/2015 | Nakayama | |
| 2017/0102650 | A1 * | 4/2017 | Shimura | H05B 3/03 |
| 2018/0182510 | A1 * | 6/2018 | Kurokawa | H01R 12/82 |

FOREIGN PATENT DOCUMENTS

| | | | |
|---|---|---|---|
| JP | H09319240 | A | 12/1997 |
| JP | 2001125408 | A | 5/2001 |
| JP | 2016151757 | A | 8/2016 |
| JP | 2017054071 | A | 3/2017 |
| JP | 2019012199 | A | 1/2019 |

OTHER PUBLICATIONS

Notice of Allowance issued in U.S. Appl. No. 16/902,548 mailed Oct. 27, 2021.

Office Action issued in U.S. Appl. No. 16/902,548 mailed Feb. 7, 2022.

Notice of Allowance issued in U.S. Appl. No. 16/902,548 mailed Jul. 6, 2022.

* cited by examiner

IMAGE HEATING APPARATUS AND IMAGE FORMING APPARATUS

BACKGROUND OF THE INVENTION

Field of the Invention

The present invention relates to an image heating apparatus of a fixing apparatus that is installed in an electrophotographic recording type image forming apparatus (e.g. copier, printer) and a glossing apparatus that improves a glass value of a toner image fixed on a recording material by reheating the toner image. In particular, the present invention is related to a temperature detection configuration of a heater used for thermal fixing in a fixing apparatus, which is an example of the image heating apparatus.

Description of the Related Art

A fixing apparatus that is installed in an image forming apparatus (e.g. copier, printer), which is an example of the above mentioned image heating apparatus, conventionally includes a film to transfer heat to a recording material and a heating resistor disposed on a ceramic substrate. Further, the fixing apparatus includes a heater that comes into contact with the inner surface of the film, and a roller that forms a nip with the heater via the film. In the heater, the heating region is divided into sub-regions in the longitudinal direction of the heater, and the temperature of each sub-region can be independently adjusted. In such a fixing apparatus, a configuration, in which a thermistor (temperature detection element) is formed for each heating region and temperature is detected for each heating region, has been proposed (Japanese Patent Application Publication No. 2017-054071).

SUMMARY OF THE INVENTION

In the above mentioned configuration according to Japanese Patent Application Publication No. 2017-054071, each temperature detection element has an electric contact at the edge of the heater via a conductor, and is connected to a control substrate by an electric wire. For this electric wire, a flexible sheet, such as a flexible printed circuit (FPC) or a flexible flat cable (FFC) is used. The temperature detection element and the heater are connected by soldering the electric contacts. Use of the flexible sheet may improve assembly of the fixing apparatus since the routing of electric wires is easy. The connection portion where the flexible sheet is soldered to the electric contacts on the edge of the heater is normally reinforced by tape or adhesive, since this connection portion is strongly resistant to force in the shearing direction but is susceptible to force in the peeling direction. However, a heater which includes heating elements reaches high temperature and the tape or adhesive to be used must be resistant to high temperature, therefore concern is an increase in cost.

An object of the present invention is to provide a configuration that can reinforce the joining of the thermistor electrode of the heater and the flexible sheet without using tape and adhesive, and suppress solder peeling and electrode peeling.

To achieve the above object, an image heating apparatus that heats an image formed on a recording material according to the present invention includes:

- a first rotating member;
- a second rotating member that comes into contact with the first rotating member and forms a nip with the first rotating member so as to nip the recording material therebetween;
- a heater that heats the nip;
- a conductive sheet member that is electrically connected with the heater by being disposed so as to overlap with a part of the heater; and
- a restricting member that restricts relative positions between the sheet member and the heater while maintaining the electrically connected state between the sheet member and the heater;
- wherein the restricting member is configured so as to restrict a relative movement between the sheet member and the heater in a first direction which is a direction where the sheet member overlaps with a part of the heater, and to allow the relative movement in a second direction which is perpendicular to the first direction.

Further, to achieve the above object, an image heating apparatus that heats an image formed on a recording material according to the present invention includes:

- a first rotating member;
- a second rotating member that comes into contact with the first rotating member and forms a nip with the first rotating member so as to nip the recording material therebetween;
- a heater that heats the nip; and
- a conductive sheet member that is electrically connected with the heater by being disposed so as to overlap with a part of the heater;
- wherein the sheet member includes a sheet side reinforcing land which is disposed in a joining portion with the heater on the inner side of an electric connection portion with the heater disposed on the edge side of the sheet member,
- wherein the heater includes a heater side reinforcing land which is disposed in the joining portion at a position facing the sheet side reinforcing land,
- wherein the sheet side reinforcing land and the heater side reinforcing land that face each other are joined.

To achieve the above object, an image forming apparatus according to the present invention includes:

- an image forming portion that forms an image on a recording material; and
- a fixing portion that fixes an image formed by the image forming portion on a recording material;
- wherein the fixing portion is the above mentioned image heating apparatus.

As described above, according to the present invention, the peeling resistance of the flexible sheet, which is soldered to the thermistor electrode of the heater, can be reinforced without using tape or adhesive.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Overview of Image Forming Apparatus

Figure 1:
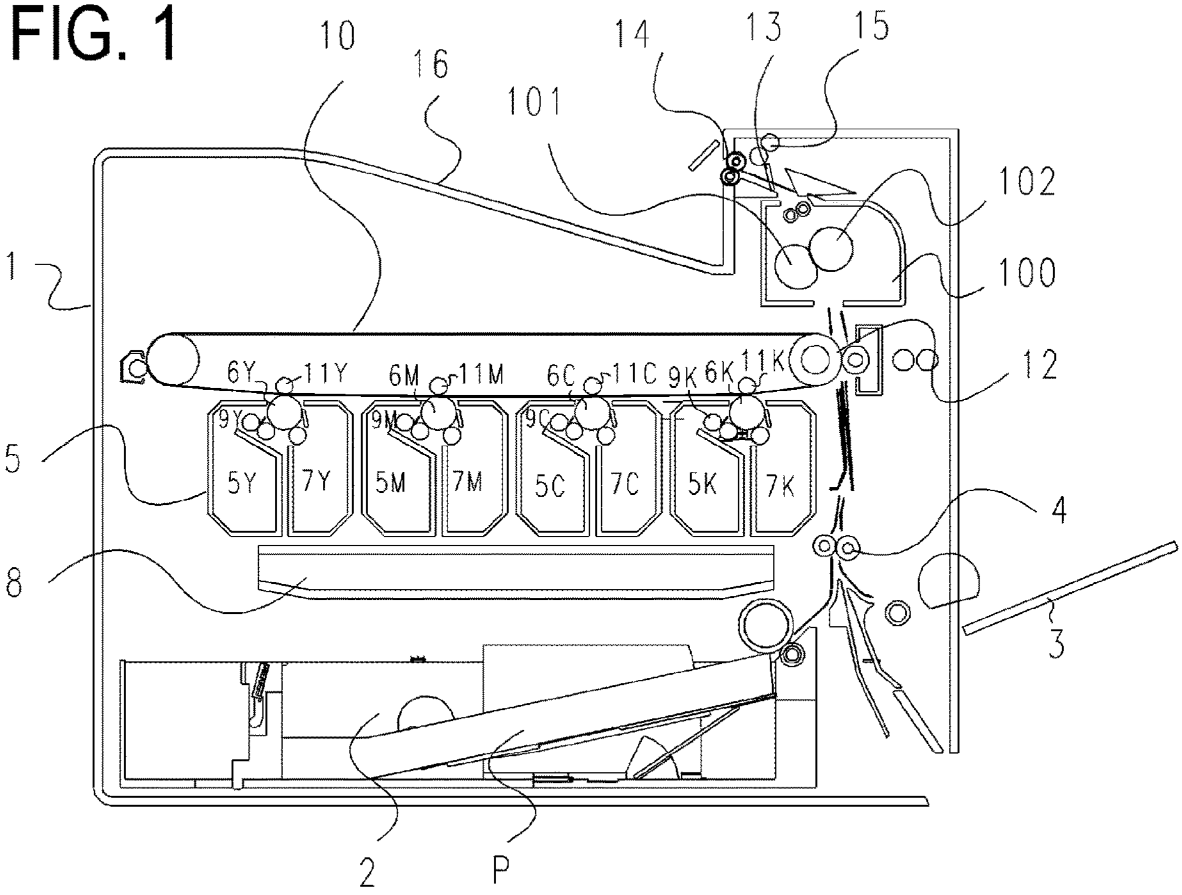
FIG. 1 is a cross-sectional view depicting a general configuration of an image forming apparatus to which the present invention can be applied.

An image forming apparatus to which the present invention is applicable will be described first. FIG. 1 is a longitudinal cross-sectional view depicting a general configuration of a printer 1 equipped with a fixing apparatus, which is an example of an image heating apparatus according to the present invention. In a lower portion of the printer 1, a drawer type cassette 2 is stored. A manual feed portion 3 is disposed on the right side of the printer 1. Recording materials P can be loaded and stored in the cassette 2 and the manual feed portion 3 respectively, and the recording materials P are separated and fed one-by-one to a resist roller 4. The printer 1 includes an image forming portion 5 where image forming stations 5Y, 5M, 5C and 5K, corresponding to the colors yellow, magenta, cyan and black respectively, are disposed in a row in the lateral direction.

In the image forming portion 5, photosensitive drums 6Y, 6M, 6C and 6K (hereafter photosensitive drums 6) which are image bearing members, and charging apparatuses 7Y, 7M, 7C and 7K which uniformly charge the surface of the photosensitive drums 6, are disposed. A scanner unit 8 which emits a laser beam based on the image information and forms an electrostatic latent image on the photosensitive drums 6; and developing apparatuses 9Y, 9M, 9C and 9K which allow toner to be attached to the electrostatic latent image so as to develop the latent image as a toner image are also disposed. Furthermore, primary transfer portions 11Y, 11M, 11C and 11K (hereafter primary transfer portions 11), which transfer the toner image of each photosensitive drums 6 to an electrostatic transfer belt 10, are also disposed. Each toner image on the transfer belt 10, which was transferred by each primary transfer portion 11, is transferred to a recording material P by a secondary transfer portion 12. Then when the transferred image passes through a fixing apparatus 100, which is a fixing portion (image heating portion), the transferred image is fixed to the recording material P by pressure and heat from a heating unit 101 and a pressure roller 102 which comes into contact with the heating unit 101 by pressure. Then the transporting path is switched by a double-sided flapper 13, and the recording material P is transported either to a discharging roller pair 14 or a switch-back roller pair 15. If the recording material P is transported to the switch-back roller pair 15 side, the recording material P is reversed by the switch-back roller pair 15, and passes through the resist roller 4, the secondary transfer portion 12 and the fixing apparatus 100 again, and is then transported to the discharging roller pair side 14 for double-sided printing. Finally, the recording material P passes through the discharging roller pair 14 and is discharged to a recording material P loading portion 16.

A fill color laser beam printer which includes a plurality of photosensitive drums 6 was described above as the image forming apparatus, but the present invention may also be applied to a fixing apparatus included in a monochrome copier or printer which includes one photosensitive drum 6.

Fixing Apparatus

Figure 2:
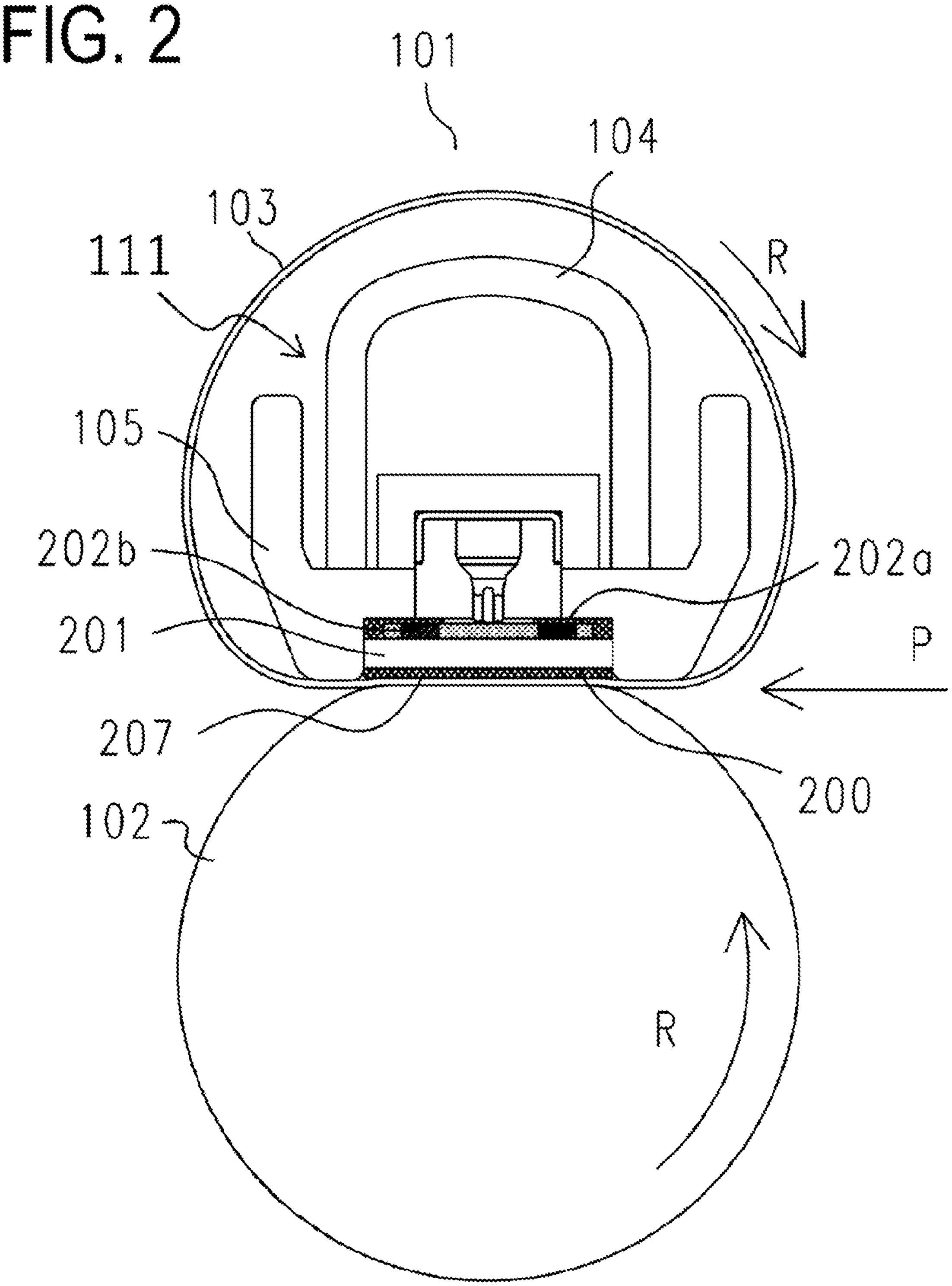
FIG. 2 is a cross-sectional view depicting a configuration of a fixing nip according to Embodiments 1, 2 and 3 of the present invention.

The fixing apparatus to which the present invention is applicable will be described next with reference to FIG. 2. FIG. 2 is a cross-sectional view of a fixing nip constituted by the heating unit 101 and the pressure roller 102. The heating unit 101 includes: a tubular film 103 which is a first rotating member; a heater 200 which is disposed on the inner side of the film 103, a heater holding member 105 which holds the heater 200; and a metal stay member 104. The heater 200, the heater holding member 105 and the stay member 104 constitute a heater unit 111. The heater 200 has a heating element on the opposite side of the film 103 with respect to a base layer 201 (on the rear surface), and the heating element includes a first heating resistor 202*a* and a second heating resistor 202*b*, and transfers heat to the film 103 through the base layer 201 and a sliding surface layer 207. The pressure roller 102, which is a second rotating member, has a core bar which is made of metal and an elastic layer which is made of silicon rubber or the like, and forms the fixing nip using the rubber layer thereof. The heater holding member 105 is pressed in the direction toward the pressure roller 102 via the stay member 104 by a pressure unit (not illustrated). In other words, the heating unit 101 is pressed to the pressure roller 102, so that the heating unit 101 and the pressure roller 102 form a fixing nip that holds the recording material P being transported. The pressure roller 102 is rotary-driven by the driving unit (not illustrated) in the rotating direction R, and the film 103 is driven in the rotating direction R as the pressure roller 102 rotates.

Heater

Figures 3A, 3B, 3C, 3D, 3E:
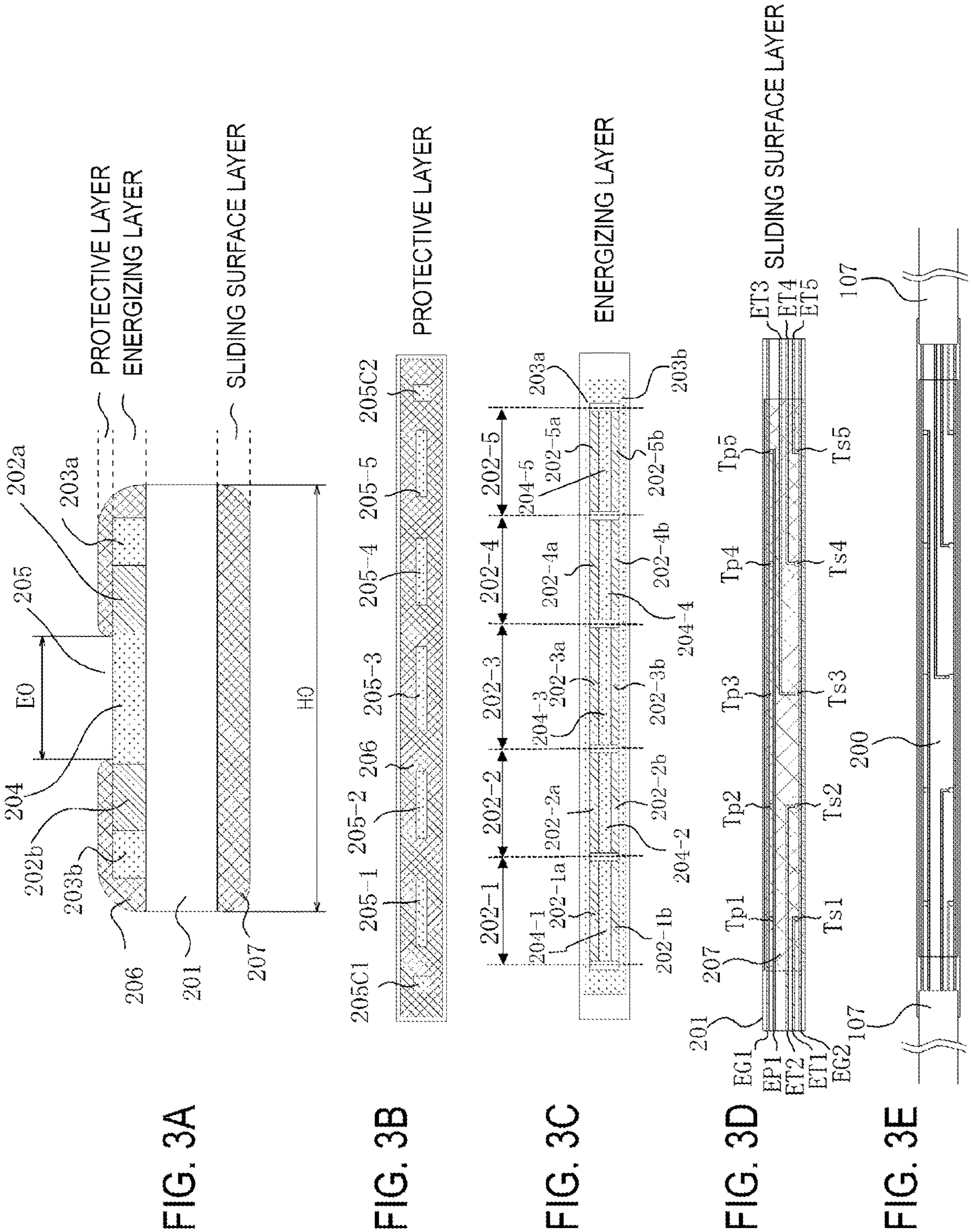
FIGS. 3A to 3E are diagrams depicting a configuration of a heater.

Features of the heater to which the present invention is applied will be described with reference to FIGS. 3A to 3E. FIG. 3A is a cross-sectional view of the heater 200 in the shorter direction (direction perpendicular to the transporting direction of the recording material P). The heater 200 is heated by the first heating resistor 202*a* and the second heating resistor 202*b*, which are disposed on an energizing layer of the ceramic substrate 201 of which longitudinal direction is a direction perpendicular to the transporting direction of the recording material P. In the energizing layer, a first conductor 203 and a second conductor 204 are disposed along the longitudinal direction of the heater. The first conductor 203 branches to the upper stream side and the lower stream side in the transporting direction of the recording material P, that is, 203*a* and 203*b* respectively. The second conductor 204 is disposed between the first heating resistor 202*a* and the second heating resistor 202*b*.

On the rear surface of the heater 200, an insulating protective layer 206 is disposed so as to cover the two heating resistors 202*a* and 202*b* and the conductors 203 and 204. On the sliding surface side where the heater 200 slides with the film 103, a sliding surface layer 207, which is coated with a material having good slidability (e.g. glass, polyimide), is disposed.

FIGS. 3B, 3C and 3D are plan view of each layer of the heater 200. In the heater 200, a plurality of heating blocks, each of which includes the second conductor 204, the first heating resistor 202*a* and the second heating resistor 202*b* are disposed in the energizing layer, are disposed in the longitudinal direction of the heater 200. In the case of the heater 200 of Embodiment 1, a total of five heating blocks are disposed in the longitudinal direction of the heater 200. A first heating block 202-1 is constituted of: a first heating resistor 202-1*a* and a second heating resistor 202-1*b* which are formed symmetrically in the shorter direction of the heater 200; a part 204-1 of the second conductor 204; and a later mentioned electrode 205-1. Similarly, a second heating block 202-2 is constituted of: a first heating resistor 202-2*a* and a second heating resistor 202-2*b*; a part 204-2 of the second conductor 204; and a later mentioned electrode 205-2. A third heating block 202-3 is constituted of: a first heating resistor 202-3*a* and a second heating resistor 202-3*b*; a part 204-3 of the second conductor 204; and a later mentioned electrode 205-3. A fourth heating block 202-4 is constituted of: a first heating resistor 202-4*a* and a second heating resistor 202-4*b*; a part 204-4 of the second conductor 204; and a later mentioned electrode 205-4. A fifth heating block 202-5 is constituted of: a first heating resistor 202-5*a* and a second heating resistor 202-5*b*; a part 204-5 of the second conductor 204; and a later mentioned electrode 205-5.

The first conductor 203 is disposed in the longitudinal direction of the heater 200. The first conductor 203 is constituted of a conductor 203*a* and a conductor 203*b*. The conductor 203*a* is connected with the first heating resistor 202-1*a*, 202-2*a*, 202-3*a*, 202-4*a* and 202-5*a* of each heating block. The conductor 203*b* is connected with the second heating resistor 202-1*b*, 202-2*b*, 202-3*b*, 202-4*b* and 202-5*b* of each heating block. In each heating block, the conductor 203*a* (first conducting portion) electrically connects the electrode 205C1 and one end of the substrate in the shorter direction, which is the opposite side of the first heating resistors 202-1*a* to 202-5*a* facing the second heating resistors 202-1*b* to 202-5*b*. Further, in each heating block, a conductor 203*b* (second conducting portion) electrically connects the electrode 205C2 and the other end of each substrate of the second heating resistors 202-1*b* to 202-5*b* in the shorter direction. The second conductor 204 is divided into 204-1, 204-2, 204-3, 204-4 and 204-5, which are connected with the heating blocks 202-1, 202-2, 202-3, 202-4 and 202-5 respectively. 204-1 to 204-5 electrically connect the electrodes 205-1 to 205-5 and the other ends of the first heating resistors 202-1*a* to 202-5*a* in the shorter direction, and connect the electrodes 205-1 to 205-5 and one ends of the second heating resistors 202-1*b* to 202-5*b* in the shorter direction, whereby 204-1 to 204-5 become the third conducting portion.

The electrodes 205C1, 205C2, 205-1, 205-2, 205-3, 205-4 and 205-5 are the openings of the protective layer 206 to supply power to the first heating resistor 202*a* and the second heating resistor 202*b*. The electrode 205C1 (a first electric contact portion) is disposed near one end of the substrate in the longitudinal direction, and the electrode 205C2 (a second electric contact portion) is disposed near the other end of the substrate in the longitudinal direction. The electrode 205C1 and the electrode 205C2 are common electrodes to supply power to the five heating blocks 202-1 to 202-5 via the conductor 203*a* and the conductor 203*b*. The electrode 205-1, on the other hand, is an electrode to supply power to the heating block 202-1. Similarly, the electrode 205-2 supplies power to the heating block 202-2, the electrode 205-3 supplies power to the heating block 202-3, the electrode 205-4 supplies power to the heating block 202-4, and the electrode 205-5 supplies power to the heating block 202-5. The electrodes 205-1 to 205-5 disposed between the electrode 205C1 and the electrode 205C2 correspond to the third electric contact portion of each heating block. A contact member (not illustrated) connected to the power supply is brought into contact with each of these electrodes to energize the electrodes, whereby power is supplied to the first to fifth heating blocks which are connected to the conductor 203*a* and the conductor 203*b* parallel with each other.

By changing the ratio of power to be supplied to the divided heating blocks 202-1 to 202-5 of the heater 200, a temperature rise at the edges of the non-paper passing regions, where the recording paper does not pass, can be suppressed. For example, in the case of fixing a recording paper having a width corresponding to the heating blocks 202-3, power is supplied only to a heating block 202-3, whereby a temperature rise at the edges of the non-paper passing regions can suppressed by supplying power only to the heating block 202-3.

Temperature Detection Configuration

On the sliding surface layer of the heater 200, thermistors Tp1 to Tp5 and Ts1 to Ts5 (temperature detection elements) are disposed in each heating block. Using these thermistors, the temperature of each heating block is detected, and power to be supplied to the heating block is controlled. Furthermore, the conductors connected to each thermistor are also disposed on the sliding surface layer of the heater 200. The conductors EG1 and EG2 are connected to one end of the thermistors Tp1 to Tp5 and Ts1 to Ts5 respectively, and are connected to the ground potential of the thermistor temperature detection portion of the control circuit. The conductors ET1 to ET5 are connected to the thermistors Ts1 to Ts5 respectively, and are formed all the way to the edge of the heater 200 in the longitudinal direction. The conductor EP1 is connected to the edges of the thermistors Tp1 to Tp5 on the side not connected with the conductor EG1. On the sliding surface layer, a protective glass is formed excluding the edges of the heater 200 in the longitudinal direction. A part of each conductor that is not covered by the protective glass becomes an electrode that is connected with a flexible sheet 107, which is a conductive sheet member. FIG. 3E indicates a state where the flexible sheet 107 is joined with the electrodes on the edge of the heater. On the flexible sheet 107, a conductor pattern similar to the conductor connected to each thermistor is formed and soldered with the contact point on the edge of the heater, so that the flexible sheet 107 overlaps with a part of the heater.

Contact Protection Configuration

Figure 4A:
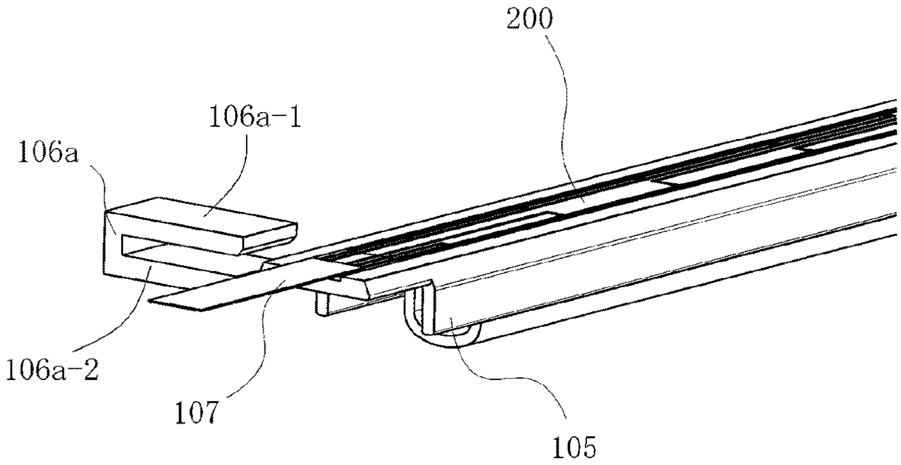
FIGS. 4A and 4B are diagrams depicting a protective configuration of a contact portion of a thermistor according to Embodiments 1 and 3 of the present invention.
Figure 4B:
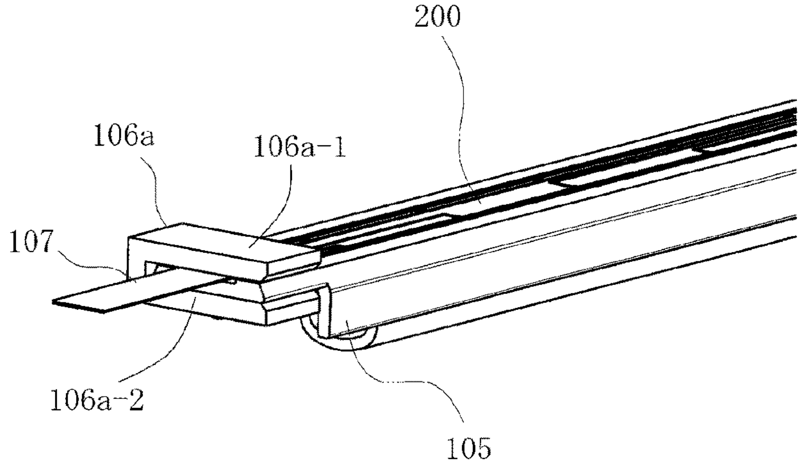
Figure 5:
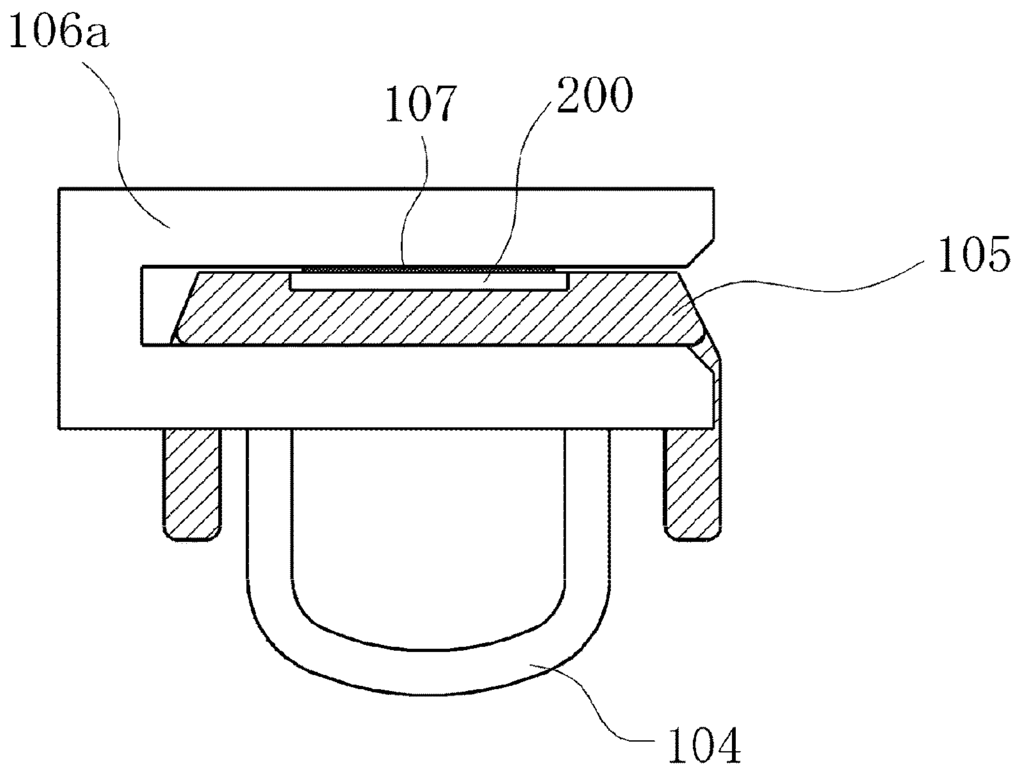
FIG. 5 is a diagram depicting a protective configuration of a contact portion of a thermistor according to Embodiments 1 and 3 of the present invention.

FIGS. 4A and 4B indicate a protection configuration of a joining portion between the flexible sheet 107 and the heater 200. FIG. 4A indicates a state before a U-shaped housing member 106*a* is installed in the heater holding member 105, and FIG. 4B indicates the state after the U-shaped housing member 106*a* is installed in the heater holding member 105. The housing member 106*a* is U-shaped, and if the direction where the flexible sheet 107 overlaps with a part of the heater is assumed to be a first direction, the housing member 106*a* includes a pair of contact portions 106*a*-1 and 106*a*-2 which extends in a second direction (direction perpendicular to the first direction), so as to be approximately parallel with each other and face each other. In Embodiment 1, the housing member 106*a*, along with a part of the heater holding member 105, is installed in the joining portion (connecting portion) between the flexible sheet 107 and the heater 200. Then, one side 106*a*-1 of the pair of contact portions comes into contact with the flexible sheet 107 in one direction of the first direction, and the other side 106*a*-2 of the pair of the contact portions comes into contact with the heater holding member 105 in the opposite direction of the one direction. As a result, the joining portion between the flexible sheet 107 and the heater 200, along with the heater holding member 105, is held by the pair of contact portions.

In other words, the flexible sheet 107, along with the heater 200 and the heater holding member 105, is layered in the opening portion of the U-shaped housing member 106*a* at the edge of the heater in the longitudinal direction. By disposing the flexible sheet 107 like this, the relative movement between the flexible sheet 107 and the heater 200 in the above mentioned first direction is restricted, and the relative movement there between in the second direction, which is perpendicular to the first direction, is allowed. As a result, the U-shaped housing member 106*a* receives the force applied to the flexible sheet 107 in the peeling direction, and it can be prevented that the force is directly applied to the joining portion between the flexible sheet 107 and the heater 200 in the peeling direction. Therefore the generation of the peeling of solder at the joining portion with the flexible sheet 107 at the edge of the heater 200 in the longitudinal direction, and the generation of the peeling of electrodes from the heater 200 and the flexible sheet 107, can be suppressed.

Furthermore, when the housing member 106*a* is installed, the electric connection state between the flexible sheet 107 and the heater 200 is maintained. At the same time, the relative movement between the flexible sheet 107 and the heater 200 in the first direction (peeling direction of the flexible sheet 107) is restricted. In other words, the housing member 106*a* functions as a restricting member that restricts the relative positions between the flexible sheet 107 and the heater 200. The movement in the second direction (which is perpendicular to the first direction), that is, in the direction of installing the housing member 106*a*, is still allowed. Therefore, unlike the case of prior art which uses tape or adhesive, assembleability when the housing member 106*a* is installed/removed can be improved. Further, in Embodiment 1, the housing member 106*a*, along with the heater holding member 105, is installed in the joining portion between the flexible sheet 107 and the heater 200, but the present invention is not limited to this. For example, the similar effect can be implemented even if the housing member 106*a* is installed in the joining portion between the flexible sheet 107 and the heater 200 directly, without the heater holding member 105.

Embodiment 2

A fixing apparatus according to Embodiment 2 of the present invention will be described next. A composing element the same as Embodiment 1 is denoted with the same reference sign, and description thereof is omitted.

Figure 6A:
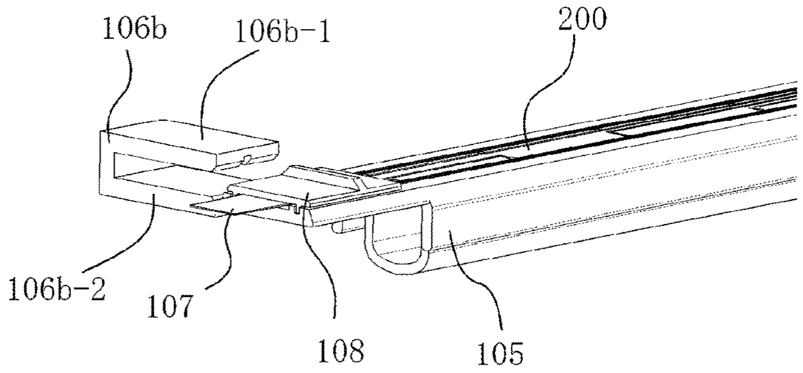
FIGS. 6A and 6B are diagrams depicting a protective configuration of a contact portion of a thermistor according to Embodiments 2 and 3 of the present invention.
Figure 6B:
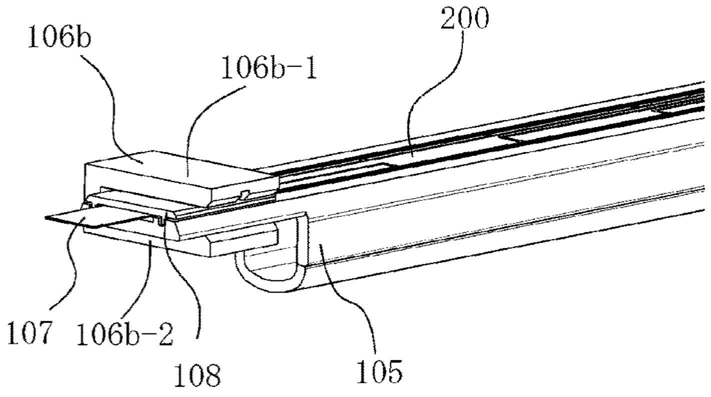
Figure 7:
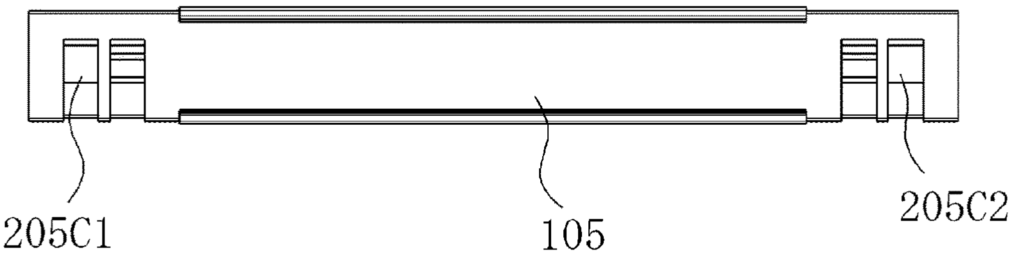
FIG. 7 is a diagram depicting a configuration of a contact of a heating electrode electrode according to Embodiments 2 and 3 of the present invention.
Figure 8:
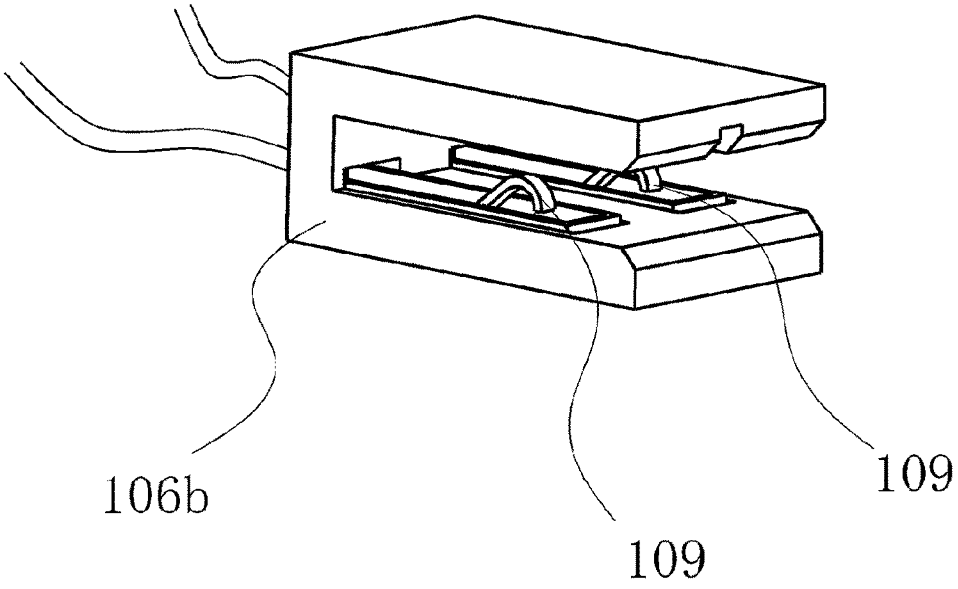
FIG. 8 is a diagram depicting a housing member that holds a contact member according to Embodiments 2 and 3 of the present invention.

FIG. 6A indicates a state before the U-shaped housing member 106*b* is installed, and FIG. 6B indicates a state after the U-shaped housing member 106*b* is installed. FIG. 7 indicates the heater holding member 105 in the state where the heater 200 is installed, viewed from the rear surface side of the heater. The housing member 106*b* includes a pair of contact portions 106*b*-1 and 106*b*-2 which extend in a second direction which is perpendicular to a first direction (first direction is a direction where the flexible sheet 107 overlaps with a part of the heater 200), and the contact portions 106*b*-1 and 106*b*-2 extend approximately parallel and face each other. The pair of contact portions of Embodiment 2 is constituted of the contact portion 106*b*-1 which comes into contact with a later mentioned spacer member 108 in one direction of the first direction, and the contact portion 106*b*-2 which comes into contact with the heater holding member 105 in the opposite direction of the one direction. Further, as illustrated in FIG. 8, at least one electric contact member 109 is disposed in the U-shaped housing member 106*b*. The electric contact member 109 is disposed in the contact portion 106*b*-2, which comes into contact with the heater holding member 105, along the inserting direction of the housing member 106*b*. When the U-shaped housing member 106*b*, along with the heater holding member 105, is installed in the joining portion between the flexible sheet 107 and the heater 200, the electric contact member 109 comes into contact with (is electrically connected with) the electrode portions 205C1 and 205C2. Power is supplied from the power supply via the housing member 106*b* to the heating resistors 202*a* and 202*b* disposed in the heater 200, and the heating resistors 202*a* and 202*b* generate heat.

As illustrated in FIGS. 6A and 6B, the spacer member 108 is disposed between the flexible sheet 107, which overlaps with a part of the heater 200, and the U-shaped housing member 106*b*. This way when the U-shaped housing member 106*b*, along with the heater holding member 105, is installed in the joining portion (connecting portion) between the flexible sheet 107 and the heater 200, the joining portion between the flexible sheet 107 and the heater 200 can be covered by the spacer member 108. In other words, according to Embodiment 2, one side 106*b*-1 of the pair of contact portions of the housing member 106*b* comes into contact with the spacer member 108 instead of the flexible sheet 107, and the other side 106*b*-2 thereof comes into contact with the heater holding member 105. Therefore the housing member 106*b* does not directly come into contact with the joining portion between the flexible sheet 107 and the heater 200, and the possibility of causing damage to the joining portion between the flexible sheet 107 and the heater 200, located at the edge of the heater sliding surface layer in the longitudinal direction, can be reduced.

The spacer member 108 has a protruding portion which extends in the same direction as the inserting direction of the housing member 106*b* to the joining portion between the flexible sheet 107 and the heater 200. This protruding portion is configured so as to engage with a groove portion formed in the contact portion 106*b*-1, which comes into contact with the spacer member 108, out of the pair of contact portions of the housing member 106*b*. By the protruding portion engaging with the groove portion of the housing member 106*b*, movement of the protruding portion in the direction perpendicular to the inserting direction of the housing member 106*b* is restricted. Further, as mentioned above, the housing member 106*b* includes the contact portion 106*b*-1 which comes into contact with the spacer member 108 and the contact portion 106*b*-2 which comes into contact with the heater holding member 105, and these two contact portions are connected at one end, as illustrated in FIG. 6A. Therefore if the movement of one contact portion 106*b*-1 of the housing member 106*b* is restricted, the movement of the other contact portion 106*b*-2 is restricted as well. Since the movement of the housing member 106*b* as a whole in the direction perpendicular to the inserting direction is restricted, the heater 200, along with the housing member 106*b*, is never displaced in the direction perpendicular to the inserting direction of the housing member 106*b*. As described above, the flexible sheet 107, the heater 200, the heater holding member 105 and the spacer member 108 can be regarded as one assembly. Then the groove portion formed in the housing member 106*b* and the protruding portion disposed in the spacer member 108 can be regarded as a restricting portion that restricts the relative movement between the housing member 106*b* and the spacer member 108 in the direction perpendicular to the inserting direction to the assembly. By this restricting portion constituted of the groove portion and the protruding portion, the movement of the housing member 106*b* is restricted, and the movement of the heater 200, with respect to the heater holding member 105, in which the housing member 106*b* is installed, in the longitudinal direction of the heater can be prevented.

Figure 9:
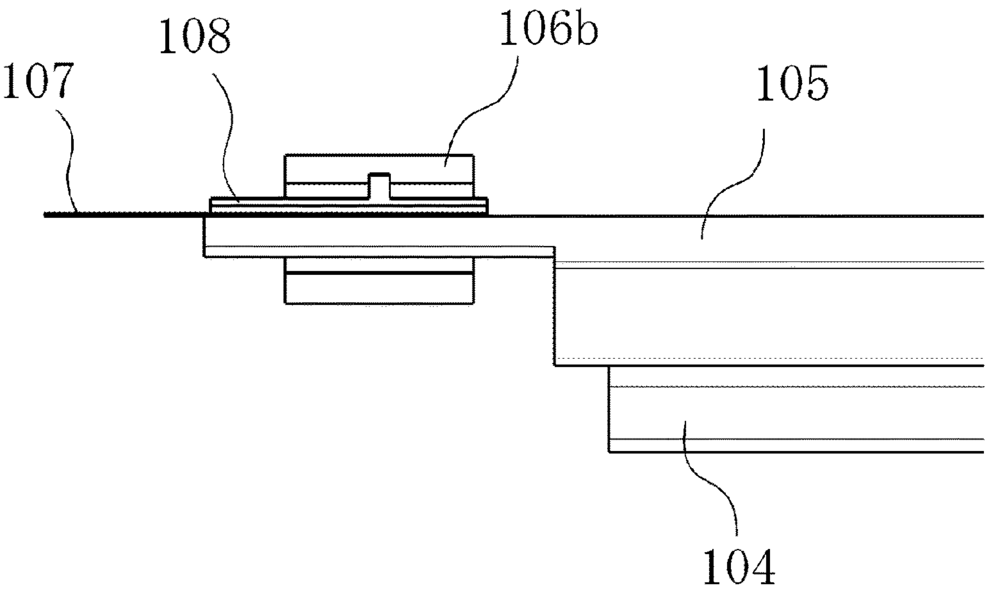
FIG. 9 is a diagram depicting a protective configuration of a contact portion of a thermistor according to Embodiments 2 and 3 of the present invention.

The electrode portions 205C1 and 205C2 of the protective layer when the heater 200 is viewed from the rear surface side, and the thermistor electrode portion of the heater sliding surface layer are both positioned at the edge of the heater in the longitudinal direction. However, in some cases, the thermistor electrode portion and the electrode portions 205C1 and 205C2, when viewed from the rear surface side of the heater, may be disposed at different positions in the longitudinal direction of the heater in order to ensure an insulating distance between the electrode portions. FIG. 9 is a diagram depicting the protective configuration of the joining portion between the flexible sheet 107 and the heater 200 in the case where the electrode portions 205C1 and 205C2 of the protective layer of the heater 200 and the thermistor electrode portion in the heater sliding surface layer are disposed at different positions in the longitudinal direction of the heater. In this configuration, the space member 108 is disposed so as to overlap with the joining portion between the flexible sheet 107 and the heater 200 at the edge of the heater 200 in the longitudinal direction. In other words, the joining portion between the flexible sheet 107 and the heater 200, along with a part of the heater holding member 105, is disposed between the pair of contact portions of the housing member 106*b*, and the spacer member 108 overlaps with the joining portion. By this configuration, the relative movement between the flexible sheet 107 and the heater 200, in the direction where the flexible sheet 107 overlaps with a part of the heater 200 (first direction), is restricted, and the relative movement of the housing member 106*b* in the inserting direction (second direction) is allowed.

As a result, the U-shaped housing member 106*b* receives, via the spacer 108, the force applied to the flexible sheet 107 in the peeling direction, and this can prevent the force from being directly applied to the joining portion between the flexible sheet 107 and the heater 200 in the peeling direction. Therefore the generation of the peeling of solder at the joining portion with the flexible sheet 107 at the edge of the heater 200 in the longitudinal direction, and the generation of the peeling of electrodes from the heater 200 and the flexible sheet 107, can be suppressed. The housing member 106*b* is also a restricting member when inserted, to restrict the relative movement between the flexible sheet 107 and the heater in the first direction where the flexible sheet 107 overlaps with a part of the heater 200, that is, in the peeling direction of the flexible sheet 107. However, the movement of the housing member 106*b* in the second direction, which is perpendicular to the first direction, is allowed. Therefore, unlike the case of using tape or adhesive, assembleability when the housing member 106*b* is installed/removed can be improved, just like Embodiment 1.

Embodiment 3

A fixing apparatus according to Embodiment 3 of the present invention will be described next. A composing element the same as Embodiment 1 or 2 is denoted with the same reference sign, and description thereof is omitted.

Figures 10A, 10B, 10C, 10D, 10E:
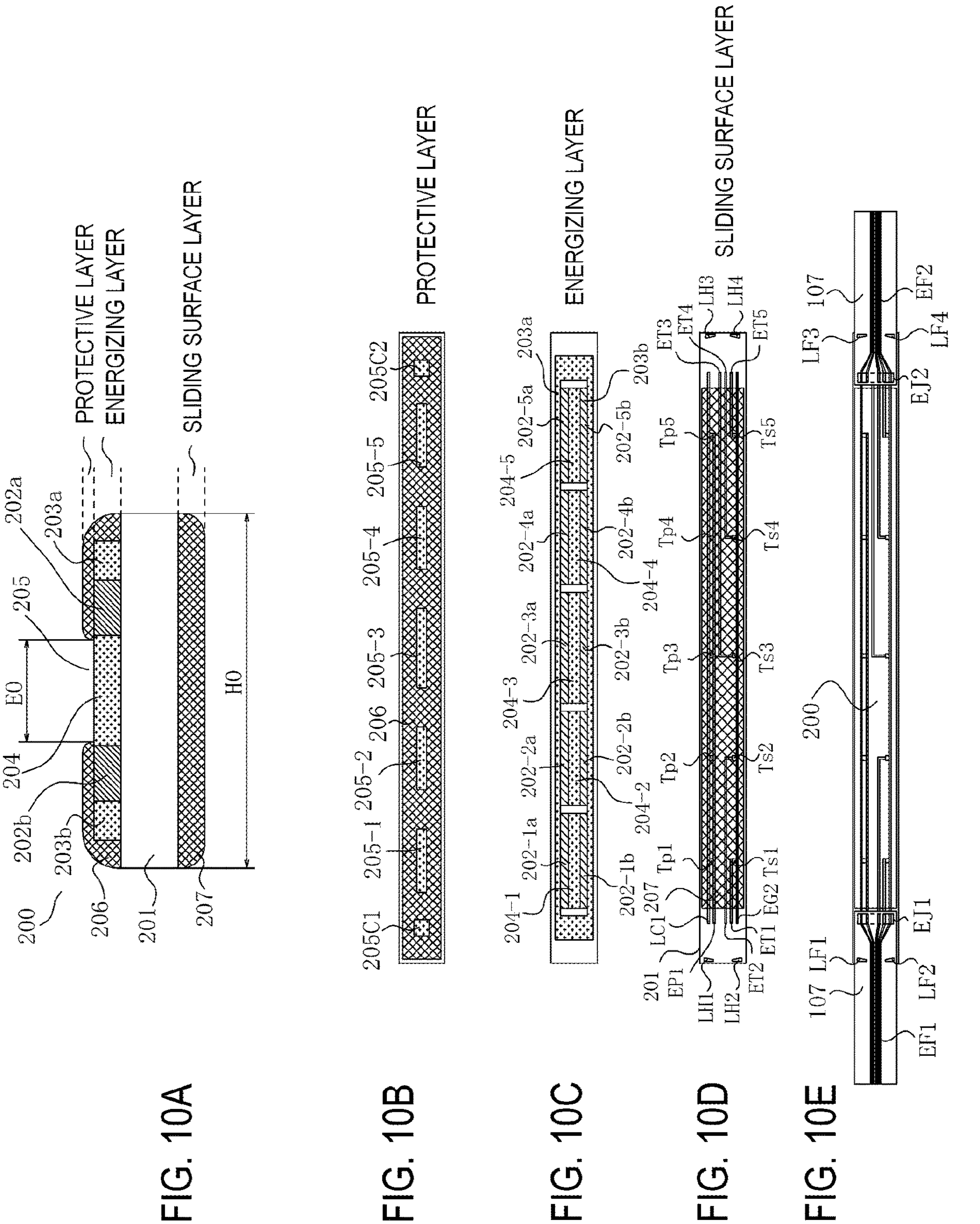
FIGS. 10A to 10E are diagrams depicting a configuration of a heater according to Embodiment 3 of the present invention.

First the features of the heater to which the present invention is applied will be described with reference to FIGS. 10A to 10E. FIG. 10A is a cross-sectional view of the heater 200 in the shorter direction (direction perpendicular to the transporting direction of the recording material P). FIGS. 10B, 10C and 10D are plan views of each layer of the heater 200. FIG. 10E indicates a state where the flexible sheet 107 is joined with the electrodes on the edges of the heater.

On both edges of the sliding surface layer of the heater 200 in the longitudinal direction, and on both edges thereof in the shorter direction, the conductors LH1 to LH4 are formed. On both edges of the heater 200, a flexible sheet 107, constituted of a first sheet member which is connected with one edge of the heater 200, and a second sheet member which is connected with the other edge of the heater 200, is disposed so as to overlap with a part of the heater 200 respectively. On one edge of the flexible sheet 107, conductors LF1 to LF4, which are similar to the conductors LH1 to LH4, formed on the heater 200, are formed and joined by solder so that the conductors LH1 to LH4 overlap with the conductors LF1 to LF4. The joining portions between the conductors LH1 to LH4 and the conductors LF1 to LF4 are the reinforcing lands to prevent the peeling of the flexible sheet 107 from the heater 200. Among these reinforcing lands, the conductors LH1 to LH4, formed on the sliding surface layer of the heater 200, correspond to the heater side reinforcing lands, and the conductors LF1 to LF4, formed on the flexible sheet 107, correspond to the sheet side reinforcing land. To be more specific, LH1 and LH2 in FIG. 10D are the first heater side reinforcing lands, and LH3 and LH4 are the second heater side reinforcing lands. LF1 to LF2 in FIG. 10E are the first sheet side reinforcing lands joined with LH1 and LH2, and LF3 and LF4 are the second sheet side reinforcing lands joined with LH3 and LH4. If the joining portion by the reinforcing land is disposed in the paper passing region, the heating resistor 202 on the heater becomes high temperature during printing, and solder may melt and peel, hence this joining portion is disposed outside the paper passing region, distant from the heating resistor 202.

These reinforcing lands are formed at the edges of the heater in the shorter direction, which are isolated from the conduction paths, thereby the conduction paths from the thermistors Ts and Tp on the heater to the conductors EF1 and EF2, formed on the flexible sheet 107, are not disconnected even if the joining portion peels. Further, the reinforcing lands join the inner side of the flexible sheet 107, with respect to the electrode joining portions EJ1 and EJ2 with the heater 200, disposed on one side of the edge of the flexible sheet 107.

Therefore when the wire of the flexible sheet 107 is routed before installing the housing member 106*a* and the spacer member 108 illustrated in FIG. 4 and FIG. 6, the force in the direction of peeling the flexible sheet is not directly applied to the joining portions EJ1 and EJ2, but to the reinforcing lands. The joining of the reinforcing lands is performed simultaneously with the joining of the electrodes at the edge of the heater 200 with the conductors EG1, EG2, EP1 and ET1 to ET5 of the flexible sheet 107. According to Embodiment 3, it can be prevented that the force in the peeling direction is applied to the flexible sheet 107 after the heater 200 and the flexible sheet 107 are joined by solder and the joining portions of the electrodes are peeled, or that the conductors formed on the flexible sheet are disconnected due the bending stress causing a conduction failure. As a result, the temperature information for each heating region, which is detected by the plurality of thermistors Tp and Ts disposed on the heater, can be stably acquired, and heating of the heater 200 can be controlled without temperature dispersion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-113878, filed on Jun. 19, 2019, and No. 2020-072459, filed on Apr. 14, 2020 which are hereby incorporated by reference herein in its entirety.

What is claimed is:

1. A heater comprising:

a plate-shaped substrate having a longitudinal direction and a width direction perpendicular to the longitudinal direction;

at least one heating resistor formed on the substrate;

at least one first conductor formed on the substrate;

at least one second conductor formed on the substrate;

a first flexible sheet connected to the substrate, the first flexible sheet including at least one electric wire electrically connected to the at least one first conductor;

a second flexible sheet connected to the substrate, the second flexible sheet including at least one electric wire electrically connected to the at least one second conductor, wherein the at least one first conductor and the at least one second conductor are formed on a side of the substrate opposite to a side where the at least one heating resistor is formed in a thickness direction of the substrate.

2. The heater according to claim 1, wherein the at least one electric wire of the first flexible sheet is connected to the at least one first conductor at a first end area of the substrate in the longitudinal direction, and the at least one electric wire of the second flexible sheet is connected to the at least one second conductor at a second end area opposite to the first end area in the longitudinal direction of the substrate.

3. The heater according to claim 1, wherein the first flexible sheet and the second flexible sheet are one of a flexible printed circuit or a flexible flat cable.

4. The heater according to claim 1, further comprising at least one first temperature detection element formed on the substrate and at least one second temperature detection element formed on the substrate, wherein the at least one first conductor is electrically connected to the at least one first temperature detection element, and the at least one second conductor is electrically connected to the at least one second temperature detection element.

5. The heater according to claim 1, wherein the at least one first conductor and the at least one electric wire of the first flexible sheet are connected by solder, and the at least one second conductor and the at least one electric wire of the second flexible sheet are connected by solder.

6. An image heating apparatus for heating an image formed on a recording material, comprising:

a tubular film;

a heater provided in an inner space of the film;

a roller configured to contact an outer peripheral surface of the film and configured to form a nip portion with the heater through the film, wherein the recording material bearing the image is heated at the nip portion while being nipped and conveyed at the nip portion, and wherein the heater is a heater according to claim 1.

* * * * *